March 25, 1941.　　　B. SHWAYDER　　　2,236,221
MACHINE FOR MAKING RIVETS
Filed April 19, 1939　　　6 Sheets-Sheet 1

INVENTOR.
BEN SCHWAYDER.
BY Thos. J. Donnelly
ATTORNEY.

March 25, 1941.   B. SHWAYDER   2,236,221
MACHINE FOR MAKING RIVETS
Filed April 19, 1939   6 Sheets-Sheet 2
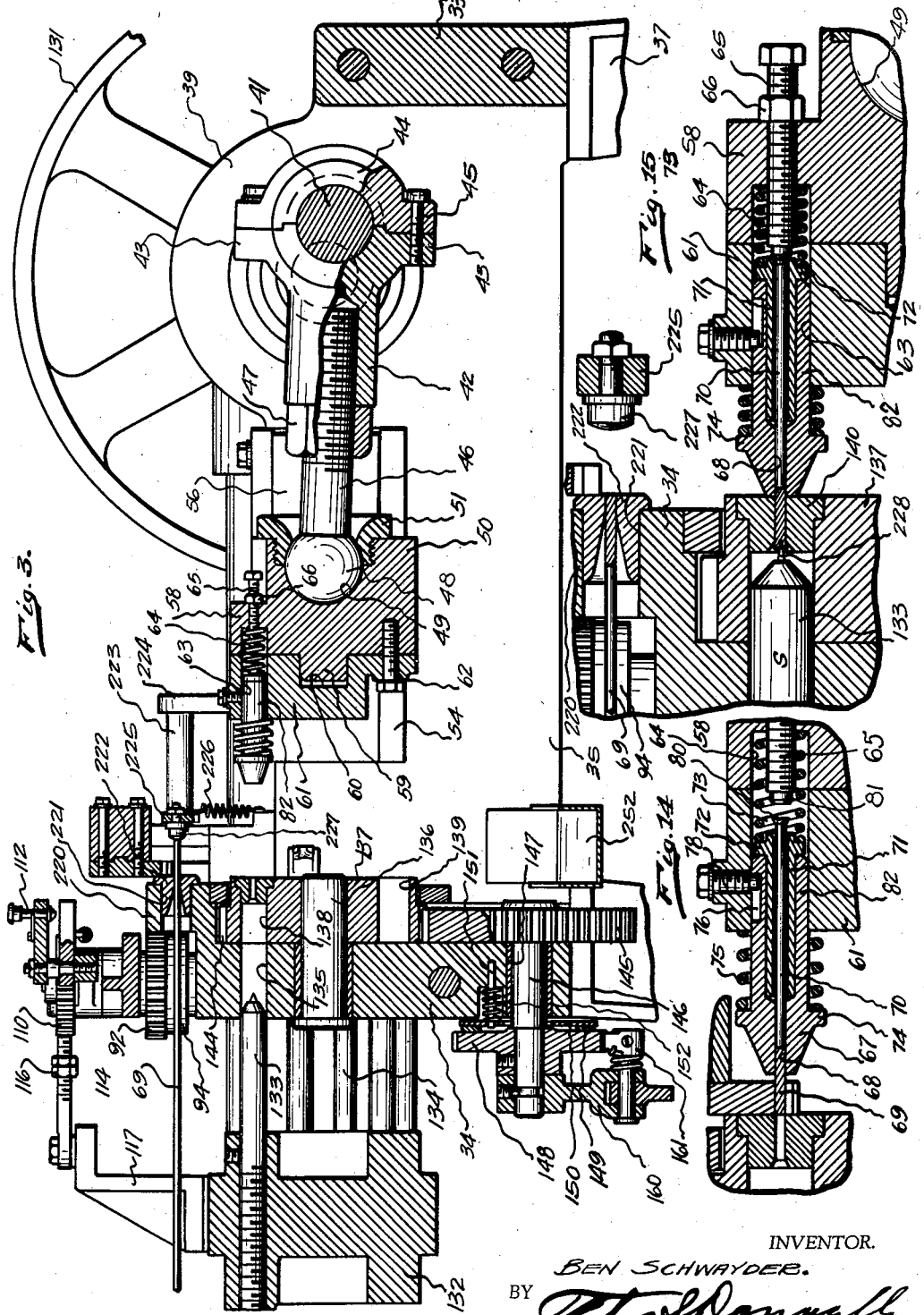
INVENTOR.
BEN SCHWAYDER.
BY
ATTORNEY.

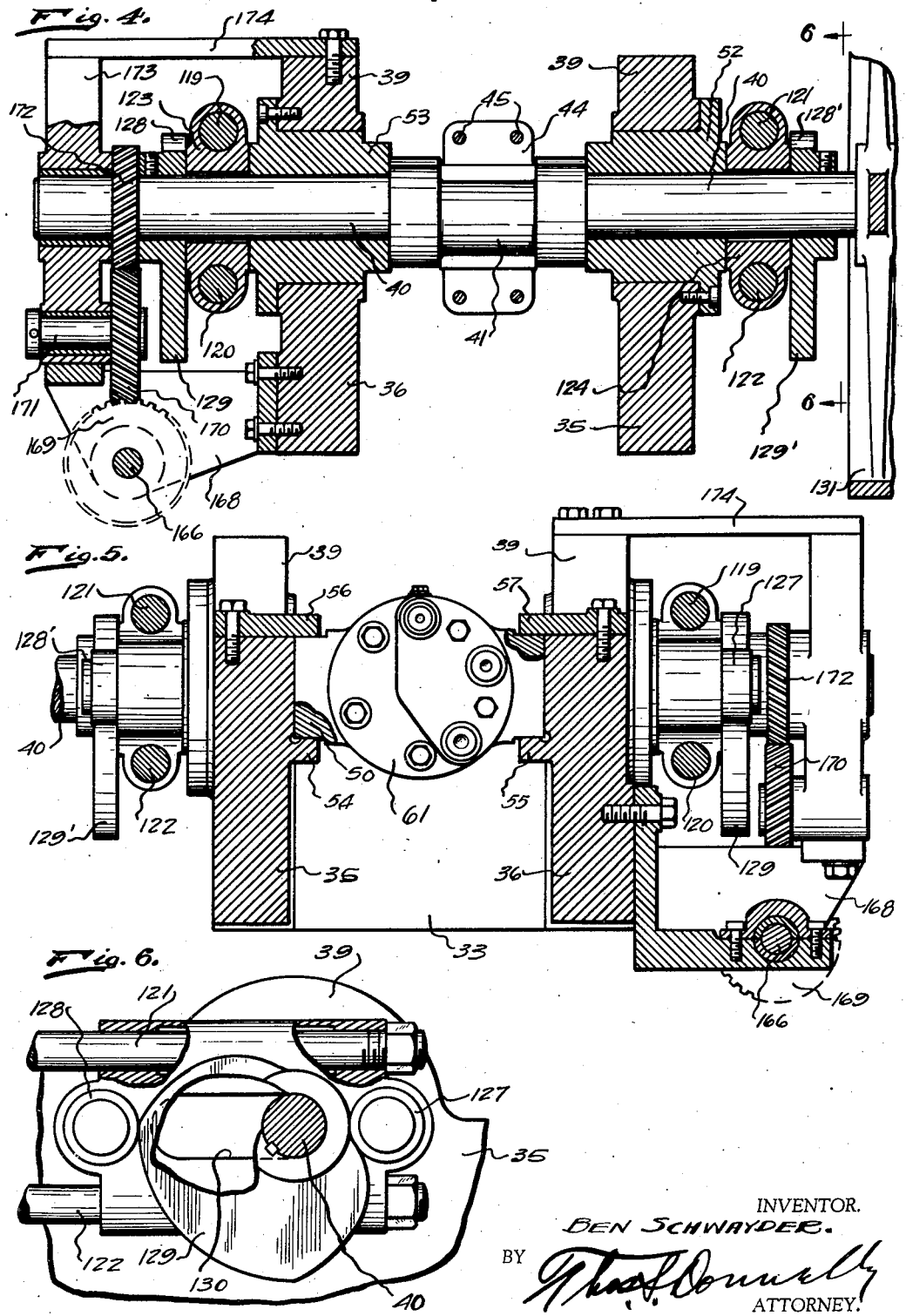

March 25, 1941. B. SHWAYDER 2,236,221
MACHINE FOR MAKING RIVETS
Filed April 19, 1939 6 Sheets-Sheet 4
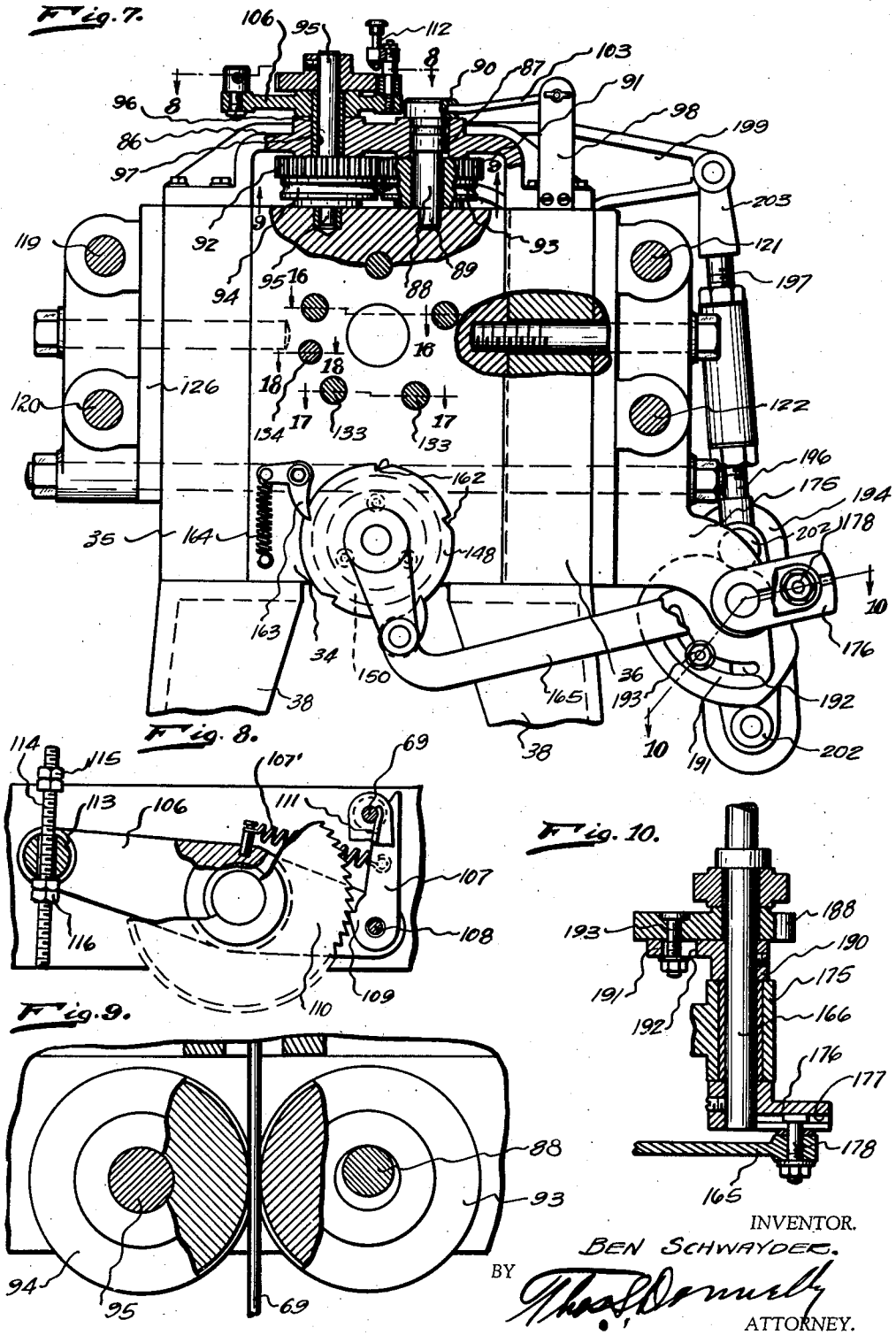
INVENTOR.
BEN SCHWAYDER.
BY
ATTORNEY.

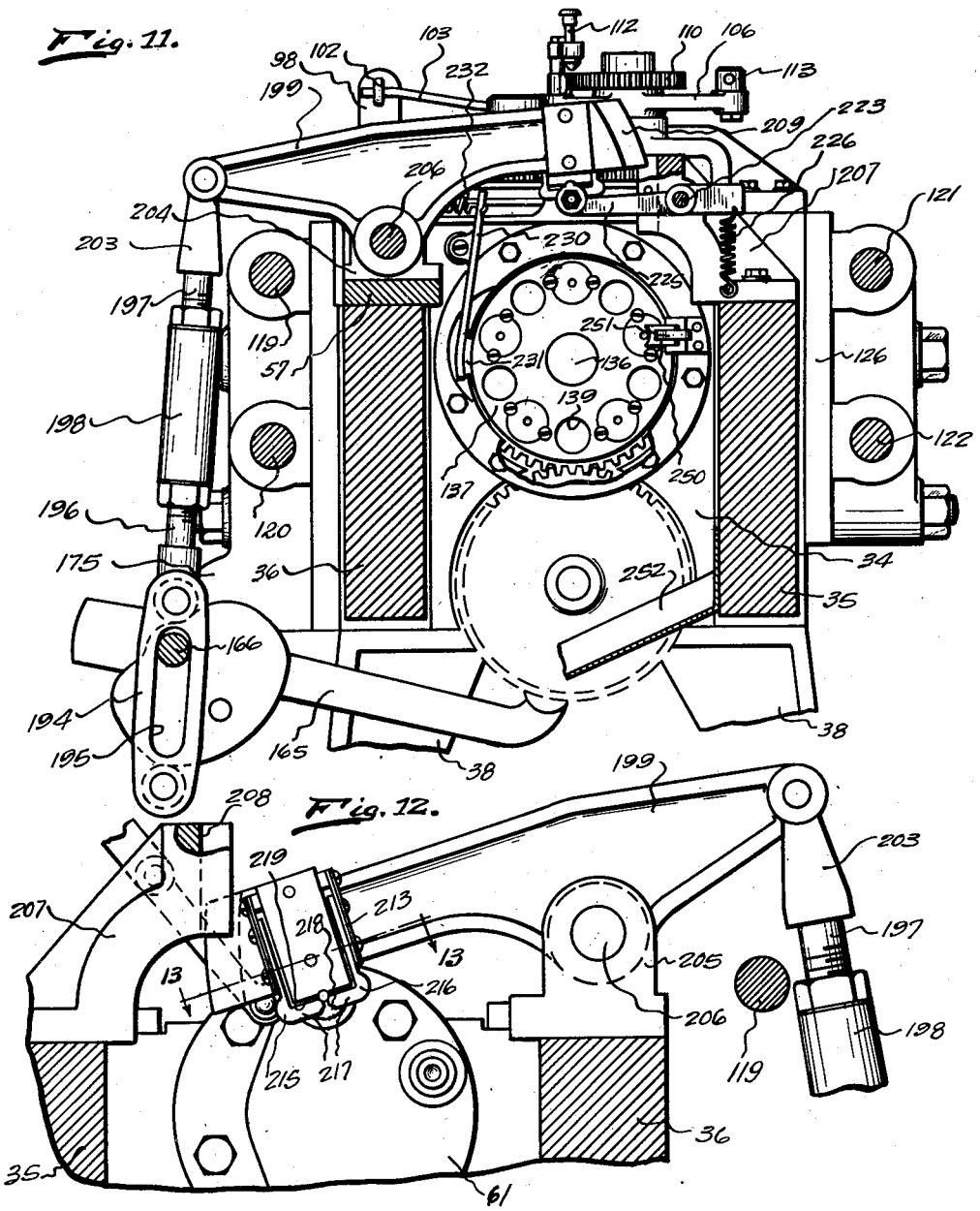
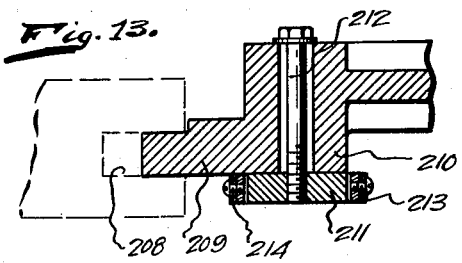

March 25, 1941.  B. SHWAYDER  2,236,221
MACHINE FOR MAKING RIVETS
Filed April 19, 1939  6 Sheets-Sheet 6
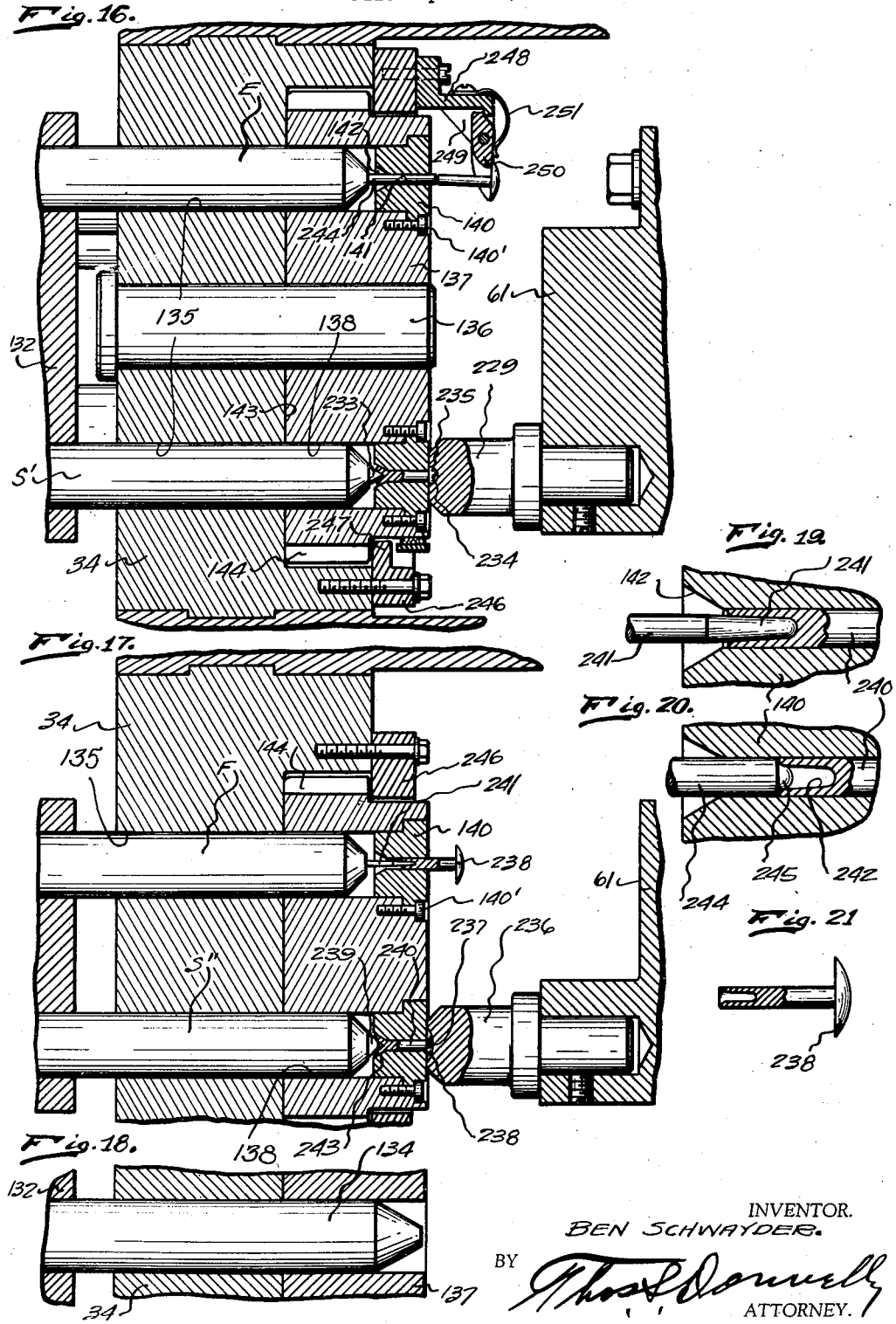
INVENTOR.
BEN SCHWAYDER.
BY
ATTORNEY.

Patented Mar. 25, 1941

2,236,221

UNITED STATES PATENT OFFICE 2,236,221

MACHINE FOR MAKING RIVETS

Ben Shwayder, Ecorse, Mich.

Application April 19, 1939, Serial No. 268,680

11 Claims. (Cl. 10—13)

My invention relates to a new and useful improvement in a method and a machine for making rivets and also relates to a rivet possessing certain characteristics resulting from the formation of the rivet according to the method illustrated herein.

The rivets referred to are of that type which have a head at one end of a stem with a socket at the opposite end so that the stem is hollow for a portion of its length proceeding inwardly from the end opposite to the head-bearing end. A common method of manufacturing these rivets is to produce a solid stem with the head thereon and then to drill the socket in the end of the rivet opposite the head-bearing end. This formation of the socket is an expensive operation and frequently the socket is not properly centered relatively to the longitudinal axis of the stem of the rivet which results in difficulties in the machine in which the rivets are clinched.

It is an object of the present invention to provide a rivet of this class in the formation of which the drilling operation will be dispensed with and the socket of which will always be properly aligned and centered relatively to the longitudinal axis of the stem of the rivet. By eliminating the drilling operations, the difficulties and disadvantages incident thereto are avoided.

It is another object of the present invention to provide a rivet of this class having a socket in one of the ends of the stem formed in an extruding operation.

It is another object of the present invention to provide a machine whereby a socket may be formed in the end of a rivet stem by an extruding operation.

Another object of the invention is the provision of a machine so adapted, arranged and constructed, that a rivet may be formed in a succession of operations having a stem with a head on one end and a socket in the opposite end of the stem without resorting to any drilling operations.

Another object of the invention is the provision of a method whereby the stock from which a rivet stem is made is upset adjacent one end and the upset portion forced through an opening of predetermined size by a centrally directed arbor for effecting a flowing of the upset portion around the arbor to provide a centrally located end socket in the stem of the rivet.

Another object of the invention is the provision of a mechanism for constructing rivets of this class according to the method referred to.

Another object of the invention is the provision of a rivet making machine having a plurality of forming members arranged for sequential operation on a piece of material for successively forming on said piece of material a head at one end and a socket at the other.

Another object of the invention is the provision of a forming machine of this class having a plurality of forming members adapted for sequential operation and provided with an indexing mechanism for positively indexing a rotatable head carrying the forming members and maintaining the same in its indexed position during the operation at that position.

Another object of the invention is the provision in a forming machine of a feeding mechanism adapted for feeding a strip of material and provided with easily actuated releasing means for releasing the feeding mechanism.

Another object of the invention is the provision in a forming machine of this class of an engaging mechanism for engaging the finished workpiece and preventing its return to a die after ejection therefrom.

Another object of the invention is the provision in a forming machine of this class of a rivet making mechanism which will be simple in structure, economical of manufacture, durable, compact, highly efficient in use and rapid in operation.

Other objects will appear hereinafter.

The invention consists in the combination and arrangement of parts hereinafter described and claimed.

The invention will be best understood by a reference to the accompanying drawings which form a part of this specification, and in which, Fig. 1 is a top plan view of the invention with parts broken away and parts shown in section.

Fig. 3 is a sectional view taken on line 3—3 of Fig. 1.

Fig. 4 is a sectional view taken on line 4—4 of Fig. 2.

Fig. 5 is a sectional view taken on line 5—5 of Fig. 2.

Fig. 6 is a fragmentary side elevational view of a part of the invention with parts broken away and parts shown in section, taken on line 6—6 of Fig. 4.

Fig. 7 is a sectional view taken on line 7—7 of Fig. 2 with parts broken away and parts shown in section.

Fig. 8 is a fragmentary view taken on line 8—8 of Fig. 7.

Fig. 9 is a sectional view taken on line 9—9 of Fig. 7 with parts broken away and parts shown in section.

Fig. 10 is a fragmentary sectional view taken on line 10—10 of Fig. 7.

Fig. 11 is a sectional view taken on line 11—11 of Fig. 2.

Fig. 12 is a fragmentary view illustrating the cut-off mechanism in side elevation with parts broken away and parts shown in section.

Fig. 13 is a fragmentary sectional view taken on line 13—13 of Fig. 12.

Fig. 14 is a fragmentary sectional view slightly enlarged showing a part illustrated in Fig. 3.

Fig. 15 is a fragmentary sectional view slightly enlarged illustrating the parts shown in Fig. 14 in a succeeding movement.

Fig. 16 is a sectional view of the forming heads slightly enlarged illustrating a step successive to the step shown in Fig. 15 and taken on line 16—16 of Fig. 7.

Fig. 17 is a sectional view of the forming heads showing a step successive to the step illustrated in Fig. 16 and taken on line 17—17 of Fig. 7.

Fig. 18 is a sectional view through the forming head showing the indexing pin and taken on line 18—18 of Fig. 7.

Fig. 19 is a sectional view illustrating a step in the formation of the rivet.

Fig. 20 is a sectional view indicating the ejection movement.

Fig. 21 is a side elevational view of a finished rivet with a part broken away and a part shown in section.

Figure 1:
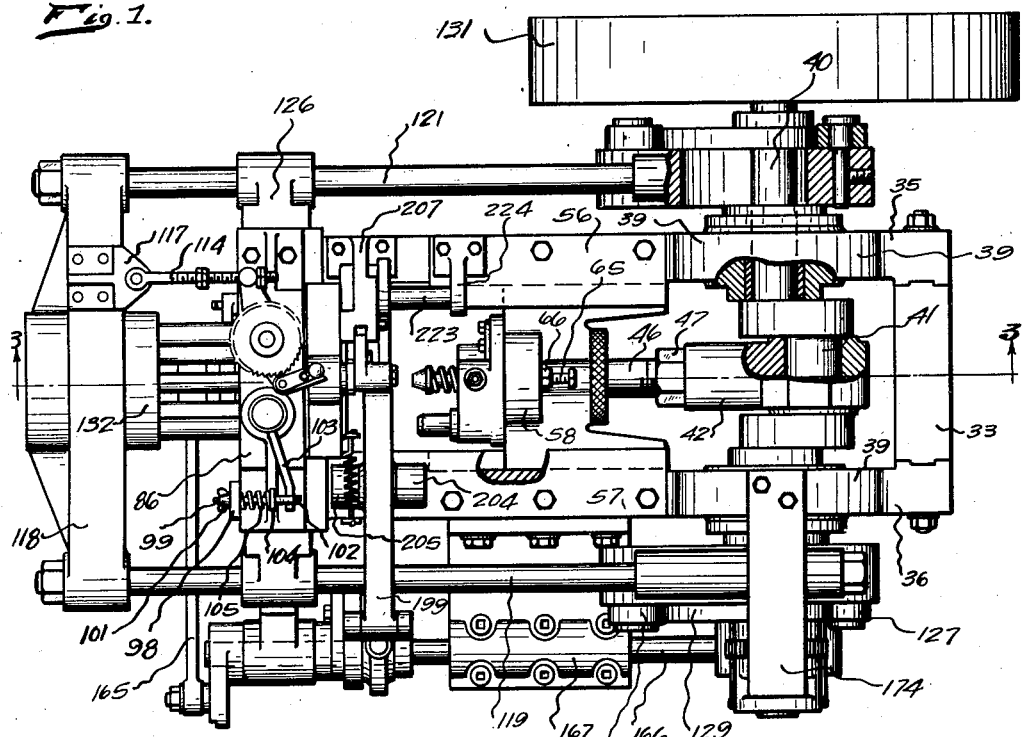

The machine illustrated in the drawings is supported on a frame embodying the end rails or end walls 33 and 34 and the side rails or side walls 35 and 36 which are supported by suitable rear standards 37 and forward standards 38. Each of the side walls is provided with an upwardly bulged portion 39 in each of which is mounted a suitable bushing 52 or 53 in which is journalled a shaft 40 having the centrally disposed crank 41 formed thereon to which is attached a pitman 42 carrying at one end a yoke 43 cooperating with the band 44 which is bolted thereto by means of the bolts 45 and serves to secure the pitman connected to the crank 41. The pitman 42 is formed tubular and internally threaded for receiving one end of the threaded connecting rod 46 on which is also threaded a lock nut 47. This connecting rod 46 carries a spherical head 48 seating in the semi-spherical recess 49 formed in the slide block 50 and secured therein by means of the jam nut 51. This slide block 50 slides upon inwardly projecting ribs 54 and 55 projecting inwardly from the inner faces of the side walls 35 and 36, respctively, as clearly appears in Fig. 3 and Fig. 5. Guide plates 56 and 57, as shown in Fig. 5, are secured to the side rails 35 and 36, respectively, and are adapted to project beyond the faces of these side rails and overlie the slide block 50 to retain the same in engagement with the upper faces of the ribs 54 and 55.

A projection 58 extends upwardly from the slide block 50 and a projection 59 projects centrally outwardly from the forward face of the slide block 50, this projection 59 engaging in the recess 60 formed in the face plate 61 which is mounted on the slide block by means of the bolt 62. Formed in the face plate 61 is a passage 63 aligning with a socket 64 formed in the projection 58. Threaded through this projection and extending into the socket 64 is a screw 65 on which is threaded a lock nut 66 (see Fig. 3 and Fig. 14).

Slidably positioned in the passage 63 is a shank 82 of a feeding tool carrying a head 67 through which is extended a passage or bore 68 opening centrally of the bore in the shank 82. This bore 68 is of substantially the same diameter as the wire or workpiece 69 which is operated upon so as to snugly receive the same. An ejector pin 70 engages in the bore 68 and extends through the bushing 71 which is fed in the tubular portion of the shank 82. This bushing 71 carries a flange 72 against which engages one end of a coil spring 73 the other end of which engages the bottom of the socket 64. Projecting outwardly from the periphery of the rear of the head 67 is a flange 74 against which engages one end of a spring 75, the other end of which engages the face of the face plate 61. Formed in the periphery of the shank 82 is an axially directed elongated groove 76 into which projects one end of a screw 78 threaded into the face plate 61 so as to limit the slidable movement longitudinally of the shank 82. The ejector pin 70 is provided with a head 80 adapted for engagement with the terminal porton or projection 81 of the screw 65.

Mounted on the forward end wall or end rail 34 is a yoke 86 having an opening or passage 87 formed therein in which engages the eccentric collar or head 90 formed on the shaft 88, the lower end of which is reduced and engages in a pocket 89 formed in the forward wall 34. Fixedly mounted on this shaft 88 is a gear 91 meshing with a gear 92. The gear 91 carries as an integral part of it the feed roller 93 cooperating with the feed roller 94 formed as a part of the gear 92, these feed rollers serving as a means for feeding the wire 69. This gear 92 is fixedly mounted upon the shaft 95 which is rotatably projected through the bushing 96 positioned in the passage 97 formed in the yoke 86.

Figure 2:
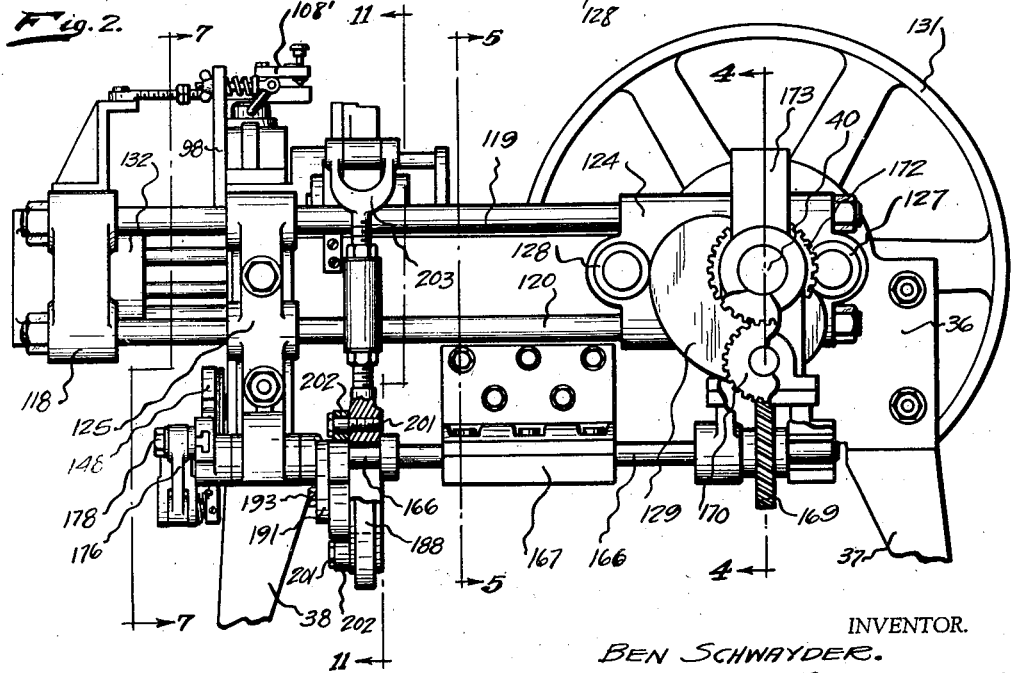
Fig. 2 is a side elevational view of the machine with parts broken away and parts shown in section.

Secured to this yoke 86 and projecting upwardly from one end thereof is a standard 98 (see Fig. 1, Fig. 2 and Fig. 7). Slidably projected through this standard or bracket 98 is a bolt 99 on which is threaded a wing nut 101. On the opposite end of this bolt is provided an eye 102 in which engages one end of the arm 103 which is secured at its opposite end to the eccentric head 90. When this arm 103 is rocked the head 90 is rotated and due to its mounting in the passage 87 and its eccentric relation to the shaft 88, the shaft 88 may be moved radially relatively to the shaft 95 thus moving the feed rollers 93 and 94 inwardly and outwardly of each other. Fixedly mounted on this bolt 99 is a collar 104 against which one end of the spring 105 engages, the other end engaging a face of the bracket or standard 98. The swinging of the arm 103 is effected by a threading of the wing nut 101 onto or off of the bolt 99. Threading of the nut onto the bolt 99 effects a compression of the spring 105, this bolt 99 being slidably projected through the bracket 98 so that it is floating relatively to the brackt 98 and its floating movement resisted by the spring 105. Thus, there is provided an adjustment means for regulating the tension of the feed rollers on the wire 69 and the engagement of the feed rollers with the wire is a yieldable one so as to permit a slight relative movement of the feed rollers upon encountering imperfections in the periphery of the wire thus assuring a constant feed of the wire.

Rockably mounted on the bushing 96 as a pivot is an arm 106 which is connected by the pivot pin 108 to one end of a pawl 107 carrying the nose 109 adapted to mesh with the ratchet teeth on the ratchet wheel 110 which is fixedly mounted on the shaft 95.

Fixedly mounted on the pin 108 (see Fig. 7 and Fig. 2) is an arm 108' which carries at one end a slidably mounted plunger 112 normally spring held in elevated position and adapted upon being pressed downwardly for engaging at its lower tapered end with a flange 111 projecting upwardly from the pawl 107 so that when forced downwardly the pawl 107 is rocked against the tension of the spring 107' so that the nose 109 does not engage the teeth of the ratchet wheel 110. When this plunger is pressed downwardly, the frictional contact with the flange 111 of the pawl 107 will be sufficient to retain the plunger in downwardly moved position so that the pawl will be held out of engagement with the ratchet teeth on the wheel 110.

The arm 106 is provided with an eyelet 113 through which is slidably projected the threaded rod 114 carrying the lock nuts 115 and 116 as shown in Fig. 8. This rod 114 is connected at its opposite end to a bracket 117 mounted on a crosshead 118. The construction is such that upon a longitudinal movement of the rod 114, the member 106 will be rocked and when rocked in one direction the nose 109 of the pawl 107 will ride over the ratchet teeth of the ratchet wheel 110. When rocked in the opposite direction, the nose 109 in engagement with the teeth of the ratchet wheel 110 will effect a rotation of the shaft 95 a predetermined distance, this distance being one which may be varied by adjusting the space between the nuts 115 and 116. Consequently, it is seen that a rocking of the arm 106 effects an operation of the feed rollers when the pawl 107 is in operative position. When the plunger 112 is pressed downwardly, the arm 106 may rock without disturbing or operating upon the feed rollers 93 and 94.

The crosshead 118 carries openings through which the rods 119 and 120 pass. Similar rods 121 and 122 are projected through the crosshead at the opposite side. These rods also project through passages formed in the slide blocks 123 and 124 each of these slide blocks having an elongated slot 130 through which the shaft 40 projects, this shaft carrying a fly wheel 131 fixedly mounted thereon. The rods 119 and 120 also pass through passages formed in the plate 125 secured to the forward wall of the structure, and the rods 121 and 122 project through passages or guide bearings formed in the plate 126 secured to the forward end of the frame or structure.

The slide block 123 is provided on its outer face with spaced apart rollers 127 and 128 adapted to engage the periphery of the cam 129 fixedly mounted on the shaft 40 (see Fig. 2, Fig. 4 and Fig. 5). The slide block 124 is also provided on its outer face with spaced apart rollers 128' engaging the periphery of the cam 129' which is fixedly mounted upon the shaft 40. The construction is such that upon a rotation of the shaft 40, the cams will effect a reciprocation of the slide blocks 123 and 124 which will carry with them the rods 119, 120, 121 and 122, the crosshead 118 being secured to these rods and, therefore, reciprocated in this movement.

Formed on the crosshead 118 is a tool-bearing head 132 carrying a number of elongated tool-supporting rods 133 which are threaded therein and spaced circumferentially thereon. This tool-bearing head 132 also carries an indexing rod 134.

Formed in the forward wall 34 is a plurality of axially directed circumferentially spaced passages 135 through which are adapted to project the tool-bearing rods 133 and the indexing rod 134.

Rotatably mounted on this forward wall 34 by means of the shaft 136 is a die head 137 having a plurality of passages 138 formed therein into which the tool-bearing rods 133 are adapted to project. These passages 138 are circumferentially spaced to correspond with the passages 135 and alternating with each of these passages 138 is a passage 139 into each of which, upon a complete rotation of the die head 137, the indexing rod 134 is adapted successively to project (see Fig. 3 and Fig. 16). Seated in one end of each of the passages 138 is a die 140 having a central passage 141 formed therethrough and having its inner end flared to provide a recess 142 on the inner face of the die 140, these dies being retained in position by a screw head 140' so that the die may be easily and quickly removed therefrom. The bore or passage 141 is of substantially the same diameter as the wire 69 upon which it is desired to work. This die head 137 seats in a recess 143 formed in the inner or rear face of the forward wall 34. The die head is provided on its inner portion with circumferential teeth 144 which mesh with a gear 145 fixedly mounted on the shaft 146 journalled in the bushing 147 which is secured in the forward wall 34. Fixedly mounted upon the shaft 146 is an indexing disk 148 against the inner face of which are adapted to engage friction pads 149 carried by the brake disk 150 through which the shaft 146 projects. This brake disk is provided with a plurality of spaced rods 151 which project into pockets formed in the forward face of the wall 34. Each of these rods is embraced by a spring 152 which serves to force the disk outwardly so that frictional contact of the pads 149 with the inner face of the indexing disk 148 is maintained at all times.

Rotatably mounted upon the shaft 146 but non-axially movable relatively thereto is a rocker arm 160 which carries a rockable pawl 161 normally held spring pressed in engagement with the periphery of the indexing disk 148 having circumferentially spaced notches 162 formed therein. A pawl 163 is mounted on the wall 34 and normally held by the spring 164 in engagement with the disk 148 for preventing reverse rotation of the same. Connected to this rocker arm 160 is one end of an actuating arm 165.

Positioned below the rod 120 and extending parallel thereto is a rod 166 journalled in the bearing 167 which is secured to the side plate 36. This shaft 166 is also journalled in the bearing carried by the bracket 168 which is secured to the side plate 36. Mounted on the shaft 166 is a worm gear 169 meshing with the worm gear 170 which is mounted upon the shaft 171. This worm gear 170 meshes with the worm gear 172 fixedly mounted on the shaft 40, the shaft 40 being extended and being journalled as is likewise the shaft 171 in the bearing plate 173 which projects upwardly from the bracket 168 and which is connected to the side plate 36 by the plate 174 (see Fig. 4). Projecting outwardly from the member 125 is a bracket 175 which also serves as a bearing for the forward end of the shaft 166. Fixedly mounted on the forward end of the shaft 166 is an arm 176 having a groove 177 formed in its outer face and in which rides the heads of a bolt 178 which projects through one end of the arm 165, this bracket arm 176 serving as an eccentric arm.

The construction is such that, upon a rotation of the shaft 40, the shaft 166 is caused to rotate and upon a rotation of the shaft 166, the arm 176 effects a rocking of the arm 165. As the arm 165 is moved to the left of Fig. 7, the pawl 167 will ride over the periphery and the adjustment of the bolt 178 is such that this movement will be sufficient to bring the pawl 161 into engagement with the next notch 162 formed in the periphery of the indexing disk 148. As the shaft 166 continues to rotate, the arm 165 will, after the pawl 161 has been moved to the left to engage the next notch, be moved to the right of Fig. 1 so as to rotate the indexing disk 148 in a counter-clockwise direction the portion of a revolution determined by the space between the notches. Through the gearing connection with the die head 137, the die head will also be rotated the same proportion of a revolution. The brake mechanism embodying the friction pads 149 will prevent the disk 148 from moving beyond the distance which it is rocked by means of the arm 165 and the pawl 161 so that it will not continue to rotate in response to its momentum. As the arm 165 moves in either direction to the left of Fig. 7, the pawl 163 will function to prevent any reverse rotation of the disk 148.

Rockably mounted on the shaft 166 is a cam 188 which is connected by the bolt 193 to an arm 191 projecting outwardly from the collar 190 which is fixedly mounted on the shaft 166, the bolt 193 projecting through an arcuate slot 192 formed in the arm 191. The use of the bolt and slot connection described is to permit an adjustment of the cam 188 rotatably of the shaft 166. The shaft 166 projects through an elongated slot 195 formed in the link 194. This link 194 is connected by means of the rods 196 and 197 and the turn buckle 198 to the rockable cutter beam 199, the rod 197 carrying at its upper end the yoke 203 as clearly appears in Fig. 2. Connected so as to project outwardly from one of the side faces of the link 194 by means of the bolts 201 are rollers 202 which engage the periphery of the cam 188.

The cutter beam 199 is rockably mounted on a shaft 206 supported in the spaced apart lugs 204 and 205 which project upwardly from the plate 57 (see Fig. 11 and Fig. 1). As shown in Fig. 11, a bracket 207 projects upwardly from the side wall 35 and carries a head in which is formed a slot 208 which serves as a guide for the beam 199 in its rocking operations. A plate or blade 209 projecting outwardly from a head 210 carried by the end of the beam engages in the slot 208 and this blade and slot cooperating serve as the guide for the cutting beam 199. A cutting plate 211 is mounted in engagement with one side of the head 210 by means of the bolt 212. Secured to opposite sides of the cutting plate 211 are spring strips 213 and 214 which carry the downwardly projecting arms 215 and 216 each of which has an inwardly turned lower end 217 having beveled ends 218 which provide a crack through which the wire or workpiece 69 may be forced so that as the wire passes into the crack the parts 217 are sprung slightly apart against the resiliency of the strips 213 and 214 and thus the wire is held in position by these inturned ends in engagement with the lower face 219 of the cutting plate 211.

An upward projection 220 is formed on the forward wall 34 provided with a passage 221 having a die 222 mounted therein provided with a bore in alignment with the grooves in the feeding rollers 93 and 94 and through which the wire 69 is fed. A shaft 223 is mounted on the standard 224 and the bracket 207 and serves as a pivot for the rockable abutment plate 225 which is pivoted thereon intermediate its ends. This plate or arm 225 carries at its inner end a head or abutment die 227 against which the inner end of the wire 69 strikes. When it is being fed inwardly the head or abutment die 227 limits the amount of feeding of the wire 69. This arm 225 is rockably mounted so that as the cutting beam 199 is rocked downwardly on its cutting end, the arm 225 will be rocked downwardly on the wire engaging end against the tension of the spring 226 which is secured to its opposite end and to the base of the bracket 207 (see Fig. 3 and Fig. 11).

Upon a rotation of the shaft 166, which is coincident with the notch of the shaft 40, the cam 188 will effect a reciprocation of the link 194 and its connecting parts to effect a rocking of the beam 199. In Fig. 3 I have shown this beam 199 in its elevated position which is the same position shown in Fig. 11. As the link 194 is forced upwardly, the cutting end of the beam 199 will rock downwardly. It will be seen in Fig. 3 that the wire 69, thereby operated upon, has already been seated into engagement, at its end, with the abutment die 227. As the arm 199 rocks downwardly, the wire projecting outwardly from the die 222 will be first engaged by the inturned ends 217 clearly shown in Fig. 12. The wire will then be engaged with the cutting face 219 of the cutting plate 211 so that the portion of the wire lying between the outer face of the die 222 and the engaged face of the abutment die 227 will be severed and carried downwardly so as to be positioned when the cutting end of the beam 199 has rocked to its lowermost position in alignment with the bore 141 formed in the die 140. The contour of the cam 188 is such that, while the shaft 166 continues to rotate and carry with it this cam 188, the link 194 will be held stationary in the position of extreme upper movement, thus holding the cut-off piece of wire in alignment with the bore 141 formed in the die 140. While the wire is held in this position, the slide block 50 will move forward to engage the wire as shown in Fig. 14. As soon as the slide block has moved forward to this position, the rotation of the cam 188 will cause the beam 199 to rock upwardly into its initial or starting position at the cutting end. The wire 69 will then be held in the bore 68 of the head 67 and the slide block 50 will continue to move to the left of the drawing shown in Fig. 3 or Fig. 1 and force the wire 69 into the bore 141 of the die 140. As the slide block continues to move the end of the head 67 will engage against the face of the die 140 and be forced rearwardly against the compression of the springs 75 and 73. As this rearward movement continues, the head 80 of the rod 70 will engage the end of the screw 65. The position of this engagement may be adjusted by threading the screw 65 inwardly or outwardly and tightening the lock nut 66 as shown in Fig. 3. The movement will continue after the head 80 of the rod 70 has engaged the reduced end 81 of the screw 65 a sufficient length of time to permit the forcing of the cut-off piece of wire 69 fully into the die 140, as shown in Fig. 15, with a portion of the cut-off piece of wire projecting outwardly beyond the face of the die. During this movement the cam 188 will, of course, continue to rotate so that the beam 199 will continue to rock upwardly at its cutting end. When it reaches its uppermost position of movement in this direction it will remain stationary due to the contour of the cam while other operations are being effected.

As the slide block 50 moves upwardly to force the cut-off piece of wire 69 into the die 140, the cams 129 will cause the slides 123 and 124 to move rearwardly, that is, to the right of Fig. 1, moving the head 132 inwardly toward the end wall 34 and the tool shank 133 will be moved inwardly into the position shown in Fig. 3. It will be noted from Fig. 18 that the tool shanks are shorter than the indexing rod or plunger 134 so that as the head 132 moves inwardly toward the wall 34, the indexing rod or plunger 134 will enter one of the openings 139 before the tool shank enters one of the openings 135 so that the indexing rod or plunger 134 serves to align the rotatable die head 137 in proper position to retain its passages 138 in alignment with the passages 135 through which the tool shanks are adapted to project. During this movement the arm 165 will remain stationary and the rod 114 moving inwardly will rock the arm so as to cause the nose 109 of the pawl 107 to ride over the ratchet teeth of the ratchet wheel 110. This movement may be called the loading movement as it moves the pawl around the ratchet teeth to obtain the grip necessary for effecting a rotation of the ratchet wheel when the arm 106 moves in the opposite direction to feed a predetermined portion of the wire.

As shown in Fig. 7, in a complete sequence of operations in the form of structure illustrated, I use five of the tool shanks 133. The first tool shank to effect an operation is illustrated in Fig. 15 and may be designated by the letter S. The tool shank S carries on its end a tool 228 which serves to engage the piece of wire in the die 140 and penetrate its end so as to slightly spread it, the spread-out portion flowing into the recess 142. The movement of the slide block 50 and the tool head 132 is always, of course, in opposite directions and their movement in approach to each other is so timed that the tool 228 may effect a spreading of the piece of wire while the slide block 50 and parts carried thereby are in the position shown in Fig. 15. Consequently, the rod 70 serves as an abutment to back up the cut-off piece of wire while the slide tool 228 engages its inner end and spreads it apart to form an extrusion or slight head so as to prevent the withdrawal of the piece of wire from the bore 141 of the die 140. The proper timing of the slide block 50 and the tool head 132 may be effected by the adjustments possible between the sleeve 42 and the threaded stem 46 shown in Fig. 3 and the rotative relation of the cams 129 relatively to the shaft 40. When the position shown in Fig. 15 has been reached, the slide block 50 will withdraw as will also the tool head 132. The shanks 133 will clear the die head 137 and then the nuts 115 will engage the arm 106 causing the arm to be rocked in the feeding direction to feed the wire 69 into the position shown in Fig. 3. At the same time the feeding operation is effected, the arm 165 will be moved to the right of the drawing shown in Fig. 7 to rotate the indexing gear 148 a part of a revolution as previously described. This will cause the die head 137 to rotate a fraction of a revolution and carry into registration with the head 67 another die and the die in which the strip of material already operated upon by the tool carried by the shank S will be rotated into position for aligning with a head-forming tool 229 carried by the face plate 61 and circumferentially spaced from the member 67.

In order that the die head 137 may not be rotated past its proper position in response to momentum, I mount a rockable arm 230 pivotally on the forward face of the wall 34. This arm 230 carries a friction pad 231 which engages the periphery of the die head 137 and operates as a brake thereon, a spring 232 serving to retain the proper tension of the brake shoe against the periphery of the die head. When in this position, the piece of wire will be cut off as previously described and fed into a circumferential successive die carried by the die head. As the head-forming tool 229 engages the outwardly projecting end of the piece of wire, the inner end of this piece of wire will also be engaged by the spreading tool 233 carried by the shank S'. This spreading tool 233 is larger than the tool 228 and further flares out the end of the strip of wire to more completely fill the cavity or recess 142. The head-forming tool 229 is provided with a recess 234 in which the end of the wire engages and is upset to partially form a head 235 as shown in Fig. 16. As the die head is rotated again it is brought into registration with the heading tool 236 carried by the face plate 61 and as this tool 236, which is provided on its end with a recess 237, engages the partially formed head 235, it will flatten this head out into the completed head 238. At the same time, the shank S" carrying a blunt spreading tool 239, will further flare out the inner end of the strip of wire which now takes shape as the body 240 of the finished rivet so that the recess 142 is substantially completely filled and one end of the body 240 is provided with a finished head 238 and the other with a bell-like recess with the ends flared outwardly into larger diameter than the body 240 as shown in Fig. 17.

At the next operation of the machine, the die head 137 is rotated to bring the rivet as formed and illustrated at the bottom of Fig. 17 into alignment with the tool shank F which carries on its end an elongated plunger or arbor 241 of substantially the same outside diameter as the diameter of the socket 242 which it is desired to form in the end of the rivet body 240. As shown in Fig. 19, the end of this plunger or arbor 241 is slightly tapered so that the recess or socket 242 formed in the end of the body 240 is tapered from its inner end outwardly. As this tool 241 engages the body 240, after it has been formed through the operation of the tool shank S", the rivet body 240 is forcibly pressed through the die so that the extruded or flared portion 243 is forced through the bore 141 of the die 140 and caused to flow around the tapered end of the forming tool 241 to form a cavity or socket in the end of the rivet body 240 by an extruding operation.

Upon the next rotation of the die head 137, the formed and partially ejected rivet is brought into alignment with the tool shank E carrying an elongated stem 244 which serves as an ejecting tool for ejecting the rivet from the tool die. The end of this ejecting tool 244 is formed semi-spherical as at 245 so as to slightly flare or chamfer the end of the socket formed in the body 240.

As shown in Fig. 16 and Fig. 11, I have mounted on the wall 34 a retaining ring 246 having a flange 247 overlying the die head 137 and serving as a retainer for preventing axial movement of the same. Mounted on this retaining ring 246 is a bracket 248 having a depending portion 249 on which is pivotally mounted the swingable prongs 250 against which the rivet head 238 engages when the rivet is being ejected by the ejecting rod 244. As the rivet rides outwardly from the die, these prongs 250 are rocked against the tension of the spring 251 which is shown in Fig. 16 and the head 238 rides over the prongs, the prongs snapping into position inwardly of the head. These prongs serve as a means for preventing the drawing of the rivet back into the bore of the die 140 when the ejecting tool 244 is withdrawn in the event that the rivet body 240 and the ejecting tool should become fastened together. A discharge chute 252 is mounted on the side wall 35 so that the ejected rivet falling upon the discharge chute is conveyed to one side of the machine.

Thus, it is seen that there is a rivet formed at each operation of the machine, the successive operations taking place simultaneously and that the wire from which the rivet is formed is fed into the machine cut off provided with a head and formed with a socket in the non-head bearing end of the body without resorting to any drilling operations and without necessitating the removal of the rivet from the head-forming machine. In this manner I have provided a rivet having a socket formed in one end by an extruding operation and also a machine for, in a sequence of operations, forming the rivet with these characteristics.

It is believed obvious that an economical and efficiently operating machine is thus provided and a method of forming socket-bearing rivets indicated in which the disadvantages commonly encountered in forming such a type of rivet are obviated and the advantages referred to obtained.

While I have illustrated and described the preferred form of structure and the method of operation, I do not wish to limit myself to the precise details of structure shown, but desire to avail myself of such variations and modifications as may come within the scope of the appended claims.

What I claim as new is:

1. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; an indexing rod projectible into the non-die carrying passages in said head successively for securing said head against rotation; means for feeding a cut piece of wire into the passage in a die upon the securing of said head against rotation; means for upsetting one end of said wire into said countersink subsequent to the feeding operation; a tool for engaging the countersunk portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; and a plunger bearing tool engageable with the indented portion of said wire for forcing said cut piece of wire outwardly from the die and effecting a flowing of the indented portion around said plunger to provide a socket.

2. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; an indexing rod projectible into the non-die carrying passages in said head successively for securing said head against rotation; means for feeding a cut piece of wire into the passage in a die upon the securing of said head against rotation; means for upsetting one end of said wire into said countersink subsequent to the feeding operation; a tool for engaging the countersunk portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; a plunger bearing tool engageable with the indented portion of said wire for forcing said cut piece of wire outwardly from the die and effecting a flowing of the indented portion around said plunger to provide a socket; and ejecting means for removing said cut piece of wire from said plunger after ejection of a cut piece of wire from the passage in said die.

3. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; an indexing rod projectible into the non-die carrying passages in said head successively for securing said head against rotation; means for feeding a cut piece of wire into the passage in a die upon the securing of said head against rotation; means for upsetting one end of said wire into said countersink subsequent to the feeding operation; a tool for engaging the upset portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; a plunger bearing tool engageable with the indented portion of said wire for forcing said cut piece of wire outwardly from the die and effecting a flowing of the indented portion around said plunger to provide a socket; ejecting means for removing said cut piece of wire from said plunger after ejectment of a cut piece of wire from the passage in said die; and means for adjusting the amount of rotation of said die head.

4. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; an indexing rod projectible into the non-die carrying passages in said head successively for securing said head against rotation; means for feeding a cut piece of wire into the passage in a die upon the securing of said head against rotation; means for upsetting one end of said wire into said countersink subsequent to the feeding operation; a tool for engaging the upset portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; a plunger bearing tool engageable with the indented portion of said wire for forcing said cut piece of wire outwardly from the die and effecting a flowing of the indented portion around said plunger to provide a socket; ejecting means for removing said cut piece of wire from said plunger after ejectment of a cut piece of wire from the passage in said die; means for adjusting the amount of rotation of said die head; and means for releasing said feeding mechanism at will.

5. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; an indexing rod projectible into the non-die carrying passages in said head successively for securing said head against rotation; means for feeding a cut piece of wire into the passage in a die upon the securing of said head against rotation; means for upsetting one end of said wire into said countersink subsequent to the feeding operation; a tool for engaging the upset portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; a plunger bearing tool engageable with the indented portion of said wire for forcing said cut piece of wire outwardly from the die and effecting a flowing of the indented portion around said plunger to provide a socket; ejecting means for removing said cut piece of wire from said plunger after ejectment of a cut piece of wire from the passage in said die; means for adjusting the amount of rotation of said die head; means for releasing said feeding mechanism at will; means for adjusting said feeding mechanism for varying the amount of wire fed at each operation; and means for adjusting the means for feeding a cut piece of wire into a die passage for accommodating cut pieces of wire of varying lengths.

6. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; means for feeding a cut piece of wire into the passage in a die upon the securing of said head against rotation; means for upsetting one end of said wire into said countersink subsequent to the feeding operation; a tool for engaging the countersunk portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; and a plunger bearing tool engageable with the indented portion of said wire for forcing said cut piece of wire outwardly from the die and effecting a flowing of the indented portion around said plunger to provide a socket.

7. A machine of the class described, comprising: a wire feeding mechanism; a rotatable die head having a plurality of spaced axially extending circumferentially arranged passages formed therein; means for rotating said die head in steps; a die mounted in each of alternate passages formed in said die head and having a passage formed therein countersunk at one end; means for feeding a cut piece of wire into the passage in a die upon the securing of said head against rotation; means for upsetting one end of said wire into said countersink subsequent to the feeding operation; a tool for engaging the countersunk portion of said piece of wire and indenting the same during the feeding of a subsequent piece of wire into another die; means for successively, at successive steps of rotation of said die head, upsetting the opposite end of said cut piece of wire to provide a head; successive tools successively operable for further indenting the upset portion of said cut piece of wire in said countersink; a plunger bearing tool engageable with the indented portion of said wire for forcing said cut piece of wire outwardly from the die and effecting a flowing of the indented portion around said plunger to provide a socket; and ejecting means for removing said cut piece of wire from said plunger after ejectment of a cut piece of wire from the passage in said die.

8. In a machine of the class described, a wire feeding mechanism; a rotatable ratchet wheel for operating said feeding mechanism; a rockable arm; a pawl carried by said arm engageable with the teeth of said ratchet wheel and adapted upon rocking of said arm in one direction for rotating said ratchet wheel for operating said feeding mechanism; means for rocking said arm; and means operable at will for moving said pawl into inoperative position and preventing the rotation of said ratchet wheel upon the throwing of said arm.

9. In a machine of the class described, a rotatable shaft; an indexing member mounted on and rotatable in unison with said shaft; a rocker arm; a pawl carried by said rocker arm engageable with said indexing member and adapted upon rocking of said rocker arm in one direction for rotating said indexing member in the same direction; a rotatable shaft; a cam mechanism rotatable by said shaft; an operating arm reciprocable by said cam mechanism upon rotation of said cam bearing shaft for effecting a back and forth rocking of said rocker arm; and means for adjusting the position of said operating arm relatively to said cam mechanism for regulating the degree of rocking of said rocker arm.

10. In a machine of the class described, a wire feeding mechanism; a cutting mechanism for cutting pieces of wire of predetermined length; a rotatable die carrying head, said head having a plurality of circumferentially spaced axially directed passages formed therethrough; a passage-bearing die in each of some of said passages; means for rotating said head in steps of predetermined amounts of rotation, said die passages being adapted for the reception of a cut piece of wire, said die passages being countersunk on one end; means for forcing a cut piece of wire into the passages in said dies; a stationary passage-bearing member, the passages in said die carrying head individually aligning, upon rotation to predetermined positions, with the passages in said stationary member; a slidable tool-bearing head; a plurality of axially directed tools projecting outwardly from one face of said tool bearing head and engageable in the passages in said stationary member and projectible into the openings in said die carrying head upon movement of said tool carrying head toward said stationary member a predetermined distance; a slide block positioned in opposed relation to one face of said die carrying head, said die carrying head being positioned between said slide block and said tool carrying head; a plurality of circumferentially spaced head forming tools carried by and extended axially of said slide block and registering with the passages in said die carrying head upon rotation of the same to predetermined positions; and means for simultaneously moving said tool carrying head and said slide block into relative approach for simultaneously operating upon a cut piece of wire at opposite ends thereof.

11. In a machine of the class described, a wire feeding mechanism; a cutting mechanism for cutting pieces of wire of predetermined length; a rotatable die carrying head, said head having a plurality of circumferentially spaced axially directed passages formed therethrough; a passage-bearing die in each of some of said passages; means for rotating said head in steps of predetermined amounts of rotation, said die passages being adapted for the reception of a cut piece of wire, said die passages being countersunk on one end; means for forcing a cut piece of wire into the passages in said dies; a stationary passage-bearing member, the passages in said die carrying head individually aligning, upon rotation to predetermined positions, with the passages in said stationary member; a slidable tool-bearing head; a plurality of axially directed tools projecting outwardly from one face of said tool bearing head and engageable in the passages in said stationary member and projectible into the openings in said die carrying head upon movement of said tool carrying head toward said stationary member a predetermined distance; a slide block positioned in opposed relation to one face of said die carrying head, said die carrying head being positioned between said slide block and said tool carrying head; a plurality of circumferentially spaced head forming tools carried by and extended axially of said slide block and registering with the passages in said die carrying head upon rotation of the same to predetermined positions; means for simultaneously moving said tool carrying head and said slide block into relative approach for simultaneously operating upon a cut piece of wire at opposite ends thereof; and an indexing rod carried by and extending axially of said tool carrying head and permanently engaging in one of the passages in said stationary member and projectible into an aligning passage in said die carrying head, said indexing rod being of greater length than the tools extending axially of said tool carrying head.

BEN SHWAYDER.